United States Patent
Temple et al.

[15] 3,650,090
[45] Mar. 21, 1972

[54] ANALYSIS OF GASEOUS MIXTURES

[72] Inventors: Harry F. Temple; Robert L. Thomas, both of Bartlesville, Okla.

[73] Assignee: Phillips Petroleum Company

[22] Filed: June 19, 1970

[21] Appl. No.: 47,254

[52] U.S. Cl..................................55/31, 55/67, 55/68, 55/75, 73/23.1
[51] Int. Cl..................................B01d 53/04, G01n 31/08
[58] Field of Search..................55/33, 35, 62, 67, 68, 75, 55/197, 386, 32; 73/23.1

[56] References Cited

UNITED STATES PATENTS

| | | | |
|---|---|---|---|
| 3,357,158 | 12/1967 | Hollis | 55/67 |
| 3,242,651 | 3/1966 | Arnoldi | 55/62 |
| 3,359,707 | 12/1967 | Jean | 55/33 |
| 3,038,326 | 6/1962 | De Ford | 55/67 |
| 3,490,202 | 1/1970 | Ayers | 55/67 |

Primary Examiner—Charles N. Hart
Attorney—Young and Quigg

[57] ABSTRACT

A gaseous mixture containing nitrogen, carbon monoxide, carbon dioxide, hydrogen, water vapor and hydrocarbons is analyzed by injecting a sample of the mixture into a carrier gas. The carrier gas containing the sample is passed through a body of cross-linked organic polymer which retards passage of the water vapor while permitting passage of other constituents. The effluent from the body of polymer is directed to a chromatographic analyzer which contains a molecular sieve adsorbent. The body of polymer is maintained at a temperature sufficiently high to prevent condensation of the water vapor.

6 Claims, 2 Drawing Figures

INVENTORS
H. F. TEMPLE
R. L. THOMAS
BY Young & Quigg
ATTORNEYS

ANALYSIS OF GASEOUS MIXTURES

In many industrial operations there is a need to analyze gaseous mixtures of low molecular weight constituents. For example, it is desirable to analyze the effluent stream from a carbon black reactor to determine operating conditions. The gases in such a stream include nitrogen, carbon monoxide, carbon dioxide, water vapor and small quantities of various hydrocarbons. While many gaseous mixtures can readily be analyzed by means of chromatography, considerable difficulty is encountered in analyzing mixtures of the type described.

In accordance with this invention, an improved method is provided for analyzing fluid mixtures of the type described. The actual analysis is made by a conventional chromatographic analyzer which contains a molecular sieve adsorbent. Carrier gas having a sample of the mixture to be analyzed is first passed through a body of material which is capable of selectively removing the water vapor. This material is a cross-linked, finely divided, microporous organic polymer of the type hereinafter described in detail. The polymer is maintained at a temperature sufficiently high to prevent condensation of the water vapor. Such polymer retards passage of water while permitting passage of certain of the low molecular weight gases.

In the accompanying drawing.

Figure 1:
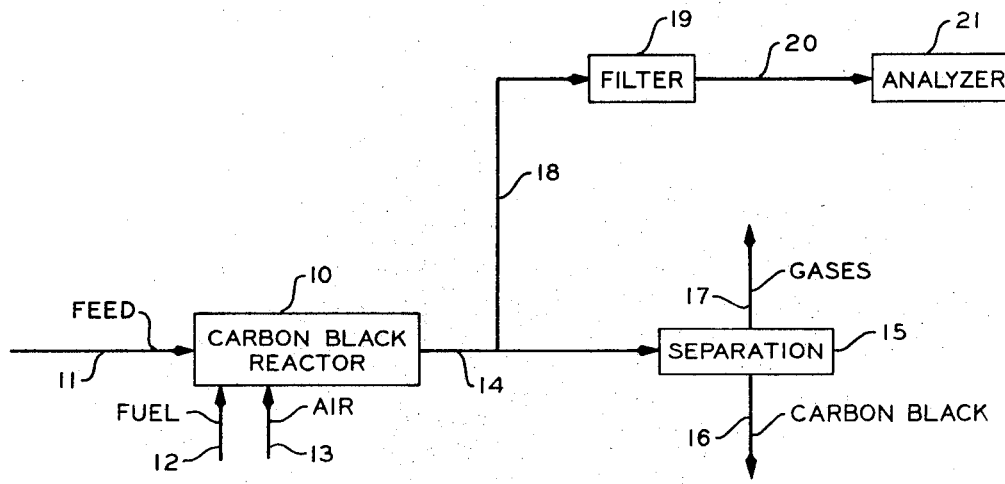
FIG. 1 is a schematic representation of carbon black producing apparatus having an analyzer constructed in accordance with this invention associated therewith.

Referring now to the drawing in detail and to FIG. 1 in particular, there is shown a conventional carbon black reactor 10. A feed stream, such as an aromatic oil, is introduced through a conduit 11. Fuel and air are introduced through respective conduits 12 and 13. The effluent from the reactor is removed through a conduit 14 and passed to separation facilities, from which carbon black is removed through a conduit 16 and effluent gases are removed through a conduit 17. In order to determine proper operating conditions of the reactor, it is desirable to analyze the gases in the effluent stream from the reactor. This is accomplished by withdrawing through a conduit 18 a sample of the reactor effluent. A filter 19 removes solid particles. The effluent from the filter is passed through a conduit 20 to an analyzer 21 which is constructed to perform the analysis method of this invention.

Figure 2:
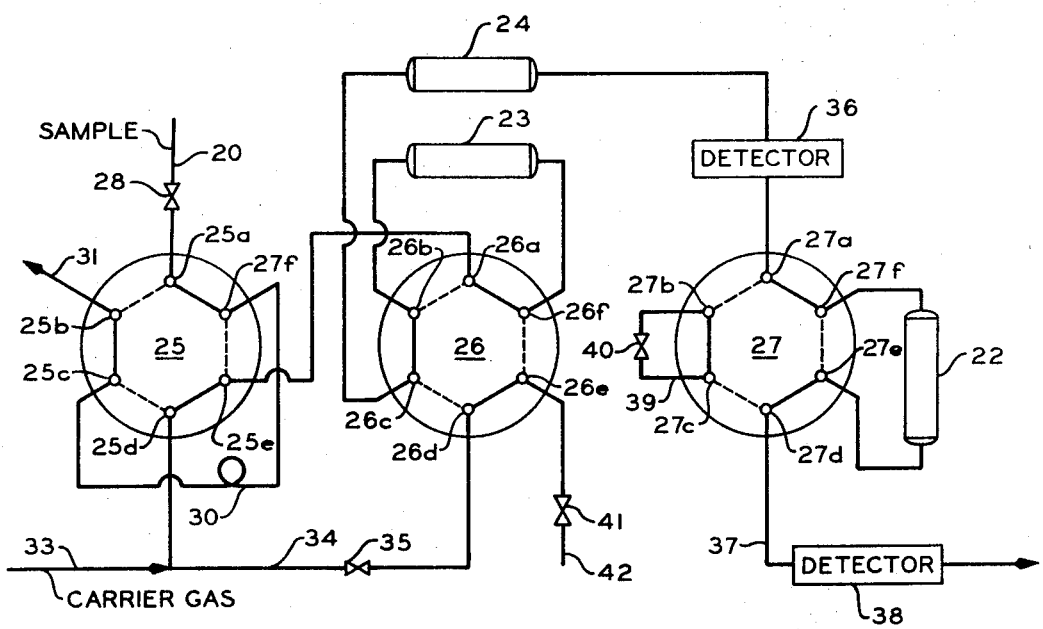
FIG. 2 is a schematic representation of apparatus capable of carrying out the method of this invention.

Analyzer 21 is illustrated schematically in FIG. 2. The analyzer includes a conventional chromatographic column 22 which is filled with a partitioning material capable of separating certain constituents of the gaseous mixture to be analyzed. A molecular sieve material, such as a synthetic zeolite, is employed as the separating material in column 22. The analyzer of FIG. 2 includes second and third columns 23 and 24 which are filled with organic polymers of the type to be described. The purpose of column 23 is to remove water vapor from the sample. The purpose of column 24 is to retard passage of carbon dioxide and acetylene while permitting passage of other constituents. The analyzer includes three stream switching valves 25, 26 and 27. Valve 25 is provided with six ports 25a, 25b, 25c, 25d, 25e and 25f. When the valve is in a first position, the individual ports are connected in the manner illustrated by the solid lines. When the valve is in a second position, the individual ports are connected in the manner shown by the broken lines. Conventional rotary or diaphragm operated chromatographic analyzer sample valves well known in the art can be employed as valve 25. Valves 26 and 27 are of corresponding structure.

The gaseous sample to be analyzed is introduced through conduit 20 which communicates with port 25a. A valve 28 is disposed in conduit 20. A sample loop 30 of predetermined volume communicates between ports 25c and 25f. A vent conduit 31 is connected to port 25b. A conduit 32 extends between port 25e and port 26a of valve 26. Carrier gas, such as helium, is introduced into the system through a conduit 30 which communicates with port 25d. A conduit 34, which has a valve 35 therein, extends between conduit 33 and port 25d. Column 24 and a detector 36 are connected between ports 26b and 27a. Column 22 is connected between ports 27e and 27f. A conduit 37 extends between port 27d and the inlet of a detector 38. A conduit 39, which has a valve 40 therein, communicates between ports 27b and 27c.

As previously mentioned, columns 23 and 24 are filled with cross-linked, finely divided, microporous organic copolymer. This copolymer is formed by polymerizing at least 20 percent by weight of at least one divinyl monomer selected from monocyclic divinyl aromatic hydrocarbons and ethylene glycol dimethacrylate and not more than 80 percent by weight of at least one monoethylenically unsaturated monomer copolymerizable therewith selected from monocyclic monovinyl aromatic hydrocarbons, N-vinyl pyridine and N-vinyl pyrrolidone. These copolymers usually have a surface area of at least 50 square meters per gram and particle sizes between 5 and 500 microns. Copolymers of this type are available commercially from Waters Associates, Inc. of Farmingham, Massachusetts, under the trademark "Porapak." These copolymers can be produced by the procedures and using the monomers described in U.S. Pat. No. 3,357,158. Column 22 contains a molecular sieve adsorbent material. In one specific embodiment of this invention column 23 was a 30 inch long tube filled with Porapak R. Column 24 was a 4 feet long tube filled with Porapak Q. Column 22 was a 6 feet long tube filled with 13X molecular sieve material.

The effluent gases from reactor 10 contain nitrogen, carbon monoxide, carbon dioxide, hydrogen, water vapor and small amounts of various hydrocarbons. The stream removed through conduit 18 is maintained at a temperature sufficiently high to prevent condensation of water vapor before the sample enters column 22. To this end, column 23 is maintained at a temperature sufficiently high to prevent condensation. A temperature of about 350° F. is quite effective for this purpose. Such a temperature can be maintained by wrapping the column around a metal mandrel which has a heating element embedded therein. A thermostat can control the current to the heating element. The mandrel and column can be positioned within an insulated housing.

In the operation of the apparatus illustrated in FIG. 2, valves 25, 26 and 27 initially occupy the first mentioned positions wherein the individual ports are connected by the solid lines. The sample to be analyzed flows through sample loop 30 and is vented through conduit 31. Carrier gas enters through conduit 33 and flows through columns 23, 24 and 22. This initial flow of carrier gas purges the columns of any constituents remaining from prior analyses. Valve 41 can be closed at this time to prevent loss of carrier gas through conduit 42. When it is desired to perform an analysis, valve 25 is actuated to the second position so that the ports are connected in the manner illustrated by the broken lines. Immediately prior to this time valve 28 is closed to discontinue the sample flow. Carrier gas from conduit 33 flows through sample loop 30 after valve 25 is actuated so as to displace the sample originally trapped in the loop. After the sample has been displaced from loop 30, valve 25 is returned to its initial position. The sample displaced from loop 30 is introduced into column 23, which in the embodiment described is maintained at a temperature of approximately 350° F.

The constituents, other than water, of the sample displaced from loop 30 flow through column 23 in a matter of a few seconds. The actual time required can readily be determined experimentally for a given sample by connecting a detector to the outlet of the column. The water initially present in the sample is retained on the packing material of column 23. When the remainder of the sample has passed through column 23, valve 26 is actuated so that ports are connected as illustrated by the broken lines. Valve 41 is opened at this same time. Carrier gas flows through column 23 in the opposite direction at this time to back-flush the column, with the effluent being vented through conduit 42. During the time that column 23 is being back-flushed, carrier gas from conduit 34 passes through column 24 to continue the flow of sample through columns 24 and 22. After a sufficient period of time has elapsed to back-flush column 23, valve 26 is returned to its initial position. Valve 35 permits adjustment of the rate of flow of carrier gas through conduit 34.

The packing material in column 24 serves to retard selectively the passage of carbon dioxide and acetylene while permitting the remaining constituents to pass into column 22. While column 23 also retards the constituents to some degree, they are passed more freely than water so that there is essentially no loss in column 23. Detector 36 provides an indication of the flow of the remaining light gases to column 22. When these gases have passed through the detector into column 22, valve 27 is actuated to direct the effluent from column 24 directly to detector 38 for measurement. After the carbon dioxide and acetylene peaks have been read, valve 27 is returned to its initial position to direct carrier fluid through column 22 and thereby elute the remaining light gas constituents into detector 38 to complete the analysis. Valve 40 permits the flow to detector 38 to be regulated when the effluent from column 24 is passed to this detector.

It is important to prevent water vapor from entering column 22 because water rapidly destroys the separating ability of the molecular sieve adsorbent. It is also important to maintain the carrier gas water-free. Column 24 is employed to advantage because carbon dioxide does not readily pass through the material in column 22.

While the invention is particularly useful in analyzing gases in the effluent from a carbon black reactor, the invention can be employed in analyzing light gases from other types of combustion process wherein water vapor is present. While the invention has been described in conjunction with presently preferred embodiments, it obviously is not limited thereto.

We claim:

1. The method of analyzing the effluent gases from a carbon black reactor, which method comprises:

filtering a sample of the effluent gases to remove solid particles and thereby obtain a gaseous mixture;

introducing said gaseous mixture into a stream of carrier gas;

passing the resulting mixture of sample and carrier gas through a first zone containing a cross-linked, finely divided, microporous organic copolymer of (1) at least 20 percent by weight of at least one divinyl monomer selected from the group consisting of monocyclic divinyl aromatic hydrocarbons and ethylene glycol dimethacrylate, and (2) not more than 80 percent by weight of at least one monoethylenically unsaturated monomer copolymerizable therewith selected from the group consisting of monocyclic monovinyl aromatic hydrocarbons, N-vinyl pyridine and N-vinyl pyrrolidone; maintaining said first zone at a temperature sufficiently high to prevent condensation of water vapor;

discontinuing the passage of said sample through said first zone before water vapor appears in the effluent from said first zone;

passing the effluent from said first zone through a chromatographic column to a detector; and passing the effluent from said chromatographic column to a detector to measure constituents of said gaseous mixture as they emerge from said chromatographic column.

2. The method of claim 1 wherein said first zone is maintained at a temperature of about 350° F.

3. The method of claim 1, further comprising the step of passing a purge gas through said first zone in a direction opposite to the direction said mixture is passed through said first zone, said purge gas being so passed after the passage of said mixture is discontinued so as to remove water vapor from said first zone.

4. The method of claim 1 wherein the effluent from said first zone is passed through a second zone prior to passage through said chromatographic column, said second zone containing a material that selectively retards passage of carbon dioxide and acetylene, and passing carbon dioxide and acetylene from said second zone to a detector.

5. The method of claim 4 wherein said second zone contains a cross-linked, finely divided, microporous organic copolymer of (1) of at least 20 percent by weight of at least one divinyl monomer selected from the group consisting of monocyclic divinyl aromatic hydrocarbons and ethylene glycol dimethacrylate, and (2) not more than 80 percent by weight of at least one monoethylenically unsaturated monomer copolymerizable therewith selected from the group consisting of monocyclic monovinyl aromatic hydrocarbons, N-vinyl pyridine and N-vinyl pyrrolidone.

6. The method of claim 1 wherein said chromatographic column contains a molecular sieve adsorbent.

* * * * *